United States Patent
Sato et al.

(10) Patent No.: US 6,306,787 B1
(45) Date of Patent: Oct. 23, 2001

(54) NICKEL HYDROXIDE PARTICLES AND PRODUCTION AND USE THEREOF

(75) Inventors: Shigeki Sato; Yasuo Araki; Masami Nakayama; Shoichi Tamura, all of Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 09/485,416

(22) PCT Filed: Dec. 7, 1998

(86) PCT No.: PCT/JP98/05534

§ 371 Date: Apr. 26, 2000

§ 102(e) Date: Apr. 26, 2000

(87) PCT Pub. No.: WO99/64355

PCT Pub. Date: Dec. 16, 1999

(30) Foreign Application Priority Data

Jun. 10, 1998  (JP) .................................................. 10-199439

(51) Int. Cl.$^7$ ...................................................... C01D 1/04
(52) U.S. Cl. .............................. 501/94; 423/592; 423/594
(58) Field of Search ..................................... 423/592, 594; 501/94

(56) References Cited

U.S. PATENT DOCUMENTS

| | | | |
|---|---|---|---|
| 5,674,643 | * | 10/1997 | Yano et al. ........................... 429/223 |
| 5,720,932 | * | 2/1998 | Amine et al. ......................... 423/594 |
| 5,788,943 | * | 8/1998 | Aladjov ................................ 423/594 |
| 5,861,131 | * | 1/1999 | Wakao ................................... 423/592 |
| 5,993,998 | * | 11/1999 | Yasuda ................................. 423/594 |
| 6,033,807 | * | 3/2000 | Yasuda ................................. 423/223 |
| 6,066,416 | * | 5/2000 | Okada et al. ......................... 429/223 |
| 6,074,784 | * | 6/2000 | Maruta ................................. 429/223 |
| 6,129,902 | * | 10/2000 | Sakamoto et al. .................... 423/594 |
| 6,132,639 | * | 10/2000 | Komatsu et al. ................... 252/182.1 |
| 6,171,728 | * | 1/2001 | Baba et al. ............................ 429/223 |
| 6,197,273 | * | 3/2001 | Nagano et al. ....................... 423/592 |
| 6,203,945 | * | 3/2001 | Baba et al. ............................ 429/223 |
| 6,207,325 | * | 3/2001 | Matsui et al. ......................... 423/594 |

FOREIGN PATENT DOCUMENTS

| | | |
|---|---|---|
| 09-270258 | 10/1997 | (JP) . |
| 10-025117 | 1/1998 | (JP) . |
| 10-074514 | 3/1998 | (JP) . |
| 10-079251 | 3/1998 | (JP) . |

* cited by examiner

*Primary Examiner*—Karl Group
(74) *Attorney, Agent, or Firm*—Wenderoth, Lind & Ponack, L.L.P.

(57) ABSTRACT

The invention provides nickel hydroxide secondary particles comprising agglomerates of primary particles of nickel hydroxide in the shape of a triangular prism or a triangular plate having a surface or a outer face in the form of a substantially equilateral triangle each side of which substantially equilateral triangle has a length of 1 to 10 $\mu$m. The invention further provides lithium nickel composite oxide secondary particles comprised of agglomerates of primary particles having a large particle diameter by mixing the nickel hydroxide secondary particles with a lithium compound and sintering the resulting mixture at a temperature of 600° C. to 1000° C. in an oxidative atmosphere.

16 Claims, 11 Drawing Sheets

NICKEL HYDROXIDE PARTICLES AND PRODUCTION AND USE THEREOF

BACKGROUND OF THE INVENTION

1. Field of the Invention

This invention relates to nickel hydroxide particles which can be used suitably as a starting material for a lithium nickel composite oxide (lithium nickelate) as a cathode (positive electrode) active material for a non-aqueous electrolyte lithium ion secondary battery, a method for production of the nickel hydroxide particles, lithium nickel composite oxide particles produced using the nickel hydroxide particles as a starting material and a method for production of the composite oxide particles.

2. Description of the Prior Art

Along with popularization of portable electronic appliances in recent years, non-aqueous electrolyte lithium ion secondary batteries having high energy density and capable of providing high voltage have attracted attention. As a cathode active material for 4V class non-aqueous electrolyte lithium ion secondary batteries, there have been known composite oxides of lithium and transition metals having layered or tunnel structures and having crystal structures allowing easy doping and dedoping of lithium ions, such as lithium cobaltate, lithium nickelate or lithium manganate. Among these composite oxides, lithium cobaltate has a problem that the raw material, cobalt is produced at limited areas and is very expensive as well as the supply thereof lacks stability. On the other hand, lithium manganate has a problem in that high energy density as in the case of lithium cobaltate can not be obtained although the material cost can be reduced relatively.

In the meanwhile, lithium nickelate has been considered promising in that nickel resource is abundant and it has satisfactory capacity characteristics compared with the above-mentioned two composite oxides, and, in addition, it can realize the highest energy density of the three. Further, there have also been known composite oxides based on lithium nickelate such as $LiNi_{1-x}M_xO_2$ (in which M represents magnesium, calcium, strontium, barium, aluminum, cobalt, manganese, iron or vanadium, and X is a number satisfying: 0<X<1) or $LiNi_{1-X-Y}Co_xM_yO_2$ (in which M represents aluminum, magnesium, calcium, strontium or barium, and X and Y each represents a number satisfying: 0<X<1, 0<Y<1 and 0<X+Y<1). These composite oxides have been positively developed heretofore since they have excellent cell characteristics, that is, they have a high charge discharge capacity, can provide high voltage, and have excellent cycle characteristics, as well as that the raw material for nickel is relatively less expensive and is supplied stably.

Such composite oxides as mentioned above can be obtained usually by dry mixing a nickel salt containing the metal M described above (and cobalt salt) or a nickel salt (and cobalt salt) and a salt of the metal M with a lithium compound, or wet mixing them in an appropriate solvent, drying and then sintering the resulting mixture at a temperature usually from 600° C. to 1000° C. for 10 to 30 hours in an oxidative atmosphere and, optionally, applying pulverization and classification.

In the method for the production of the composite oxides as described above, hydroxides, oxides, carbonates, nitrates or sulfates can be used for the nickel salt as the starting material. However, in fact, nickel hydroxide has been mainly used so far since it is produced industrially, inexpensive, stable in quality and gives less problems related to public pollution derived from gases generated from the sintering process.

However, nickel hydroxide used so far as the raw material for the production of the composite oxides is available as secondary particles of a particle diameter of about 5 to 30 $\mu$m comprised of agglomerates of a primary particles of particle diameter of about 0.1 $\mu$m Japanese Patent Laid-Open (Kokai) No. 230808/1995 recommends the use of spherical particles of a particle diameter of about 5 to 50 $\mu$m comprised of agglomerates of primary particles of a particle diameter of 0.1 $\mu$m or less. However, lithium nickelate obtained by using the known nickel hydroxide as the starting material is comprised of agglomerates of small primary particles of a particle diameter of 1 $\mu$m or less.

On the other hand, lithium nickelate known so far as a cathode active material for non-a(queous electrolyte lithium ion secondary batteries has a relatively high charge discharge capacity, but there remains a problem unsolved that, in view of practical use of lithium nickelate as a cathode active material, the capacity decreases when charge discharge cycles are conducted at a high temperature of about 45° C. or, self-discharge takes place when stored at a high temperature. As described in Japanese Patent Laid-Open No. 151988/1993 and No. 183047/1995, the problems result from the size of primary particles of lithium nickelate. That is, it is considered that they are caused, for example, because the reaction of lithium nickelate with the non-aqueous electrolyte, or the decomposition of electrolyte and the formation of films occur more remarkably on the boundaries of the lithium nickelate particles as the size of the primary particles thereof is smaller.

Then, with a view point that non-aqueous electrolyte lithium ion secondary batteries using the composite oxides such as lithium cobaltate, lithium nickelate or lithium manganate as a cathode active material are excellent in cycle characteristics or storage characteristics as described above, it has been pointed out that the composite oxide used, for example, lithium cobaltate, preferably has an average particle diameter (50%) of 2 to 10 $\mu$m in order to prevent the decrease of the capacity when charge discharge process is repeated (Japanese Patent Laid-Open No. 94822/1993). Further, it has been pointed that the decrease of the capacity less occurs even when charge discharge process is repeated at a high temperature when a composite oxide such as lithium cobaltate or lithium nickelate has such a particle size distribution that 10% accumulated diameter is 3 to 15 $\mu$m, 50% accumulated diameter is 8 to 35 $\mu$m and 90% accumulated diameter is 30 to 80 $\mu$m (Japanese Patent Laid-Open No. 151998/1993). It has also been pointed out for lithium manganese that the average particle size is preferably within a range from 30 to 100 $\mu$m (Japanese Patent Laid-Open No. 283074/1993).

On the other hand, it has been pointed out that a non-aqueous electrolyte secondary battery using a cathode active material comprising lithium manganese composite oxide has excellent cycle characteristics when the lithium manganese composite oxide has a specific surface area in the range of 0.05 to 5.0 $m^2/g$ (Japanese Patent Laid-Open No. 69790/1996).

However, nickel hydroxide that forms lithium nickelate particles having a large primary particle size has not been known heretofore, The invention has been accomplished in view of the foregoing situations in the known non-aqueous electrolyte lithium ion secondary batteries, in particular, the known cathode active material. Therefore, it is an object of the invention to provide nickel hydroxide secondary particles comprised of agglomerates of primary particles having a large primary particle diameter which can be used suitably for the production of a cathode active material for lithium ion secondary batteries, method for production of such nickel hydroxide secondary particles, lithium nickel composite oxide particles produced using the nickel hydroxide particles as the starting material, as well as a method for production of such composite oxide particles.

SUMMARY OF THE INVENTION

The invention provides nickel hydroxide secondary particles comprising agglomerates of primary particles of nickel hydroxide in the shape of a triangular prism or a triangular plate having a surface or a outer face in the form of a substantially equilateral triangle each side of which substantially equilateral triangle has a length of 1 to 10 μm.

According to the invention, the nickel hydroxide particles may contain at least one element selected from the group consisting of Mg, Ca, Sr, Ba, Al, V, Mn, Fe and Co (hereinafter often referred to as composite elements) in an atomic ratio to Ni of 0.5 or less. Such nickel hydroxide particles are often referred to hereinafter as composite nickel oxide particles and also referred to, including the above-mentioned nickel hydroxide particles, as (composite) nickel hydroxide particles.

According to the invention, the (composite) nickel oxide particles as described above may have on the surface thereof at least one element selected from the group consisting of Mg, Ca, Sr, Ba, Al, V, Mn, Fe and Co (hereinafter also referred to as deposition or coating elements) in an atomic ratio to Ni of 0.5 or less as oxides and/or hydroxides. Hereinafter, such (composite) Rickel hydroxide particles having the deposition or coating elements on the surface is often referred to as deposited or coated (composite) nickel hydroxide particles, The invention provides lithium nickel composite oxide particles obtained by mixing the (composite) nickel hydroxide particles (including deposited or coated (composite) nickel hydroxide particles) with a lithium compound and sintering the result in umixture at a temperature in the range of 600° C. to 1000° C. in an oxidative atmosphere.

The invention further provides method for production of nickel hydroxide particles which comprises adding continuously an aqueous nickel salt solution, an aqueous alkali hydroxide solution and an aqueous ammonia to a reactor having water or aqueous ammonia placed therein, whereupon neutralizing the nickel salt at a temperature of 20° C. to 50° while keeping the pl of the resulting reaction mixture in the reactor in the range of 10 to 11 and keeping the concentration of ammonia in the reaction mixture in the reactor in the range of not less than 0.5 mol/L thereby precipitating particles of nickel hydroxide and filtering and drying the particles.

According to the invention, when an aqueous solution containing at least one composite element selected from the group consisting of Mg, Ca, Sr, Ba, Al, V, Mn, Fe and Co together with the nickel salt is used and the nickel salt and the salt of the composite element are neutralized, the composite nickel hydroxide particles containing the composite elements is obtained.

Further, when an aqueous solution of the salt of the deposition element is neutralized with an aqueous alkali hydroxide solution in a slurry prepared by dispersing the (composite) nickel hydroxide particles in water, thereby depositing or coating the element in the form of oxides or hydroxides on the surface of the nickel hydroxide particles, the deposited (composite) nickel hydroxide particles are obtained.

In addition, the invention provides method for production of lithium nickel composite oxide particles which comprises mixing the (composite) nickel hydroxide particles (including deposited or coated (composite) nickel hydroxide particles) with a lithium compound and sintering the resulting mixture at a temperature in the range of 600° C. to 1000° C. in an oxidative atmosphere.

PREFERRED EMBODIMENTS OF THE INVENTION

The nickel hydroxide secondary particles according to the invention are comprised of agglomerates of primary particles of nickel hydroxide in the shape of a triangular prism or a triangular plate having a surface or a outer face in the form of a substantially equilateral triangle each side of which substantially equilateral triangle has a length of 1 to 10 μm, preferably of 1 to 7 μm.

Figure 1:
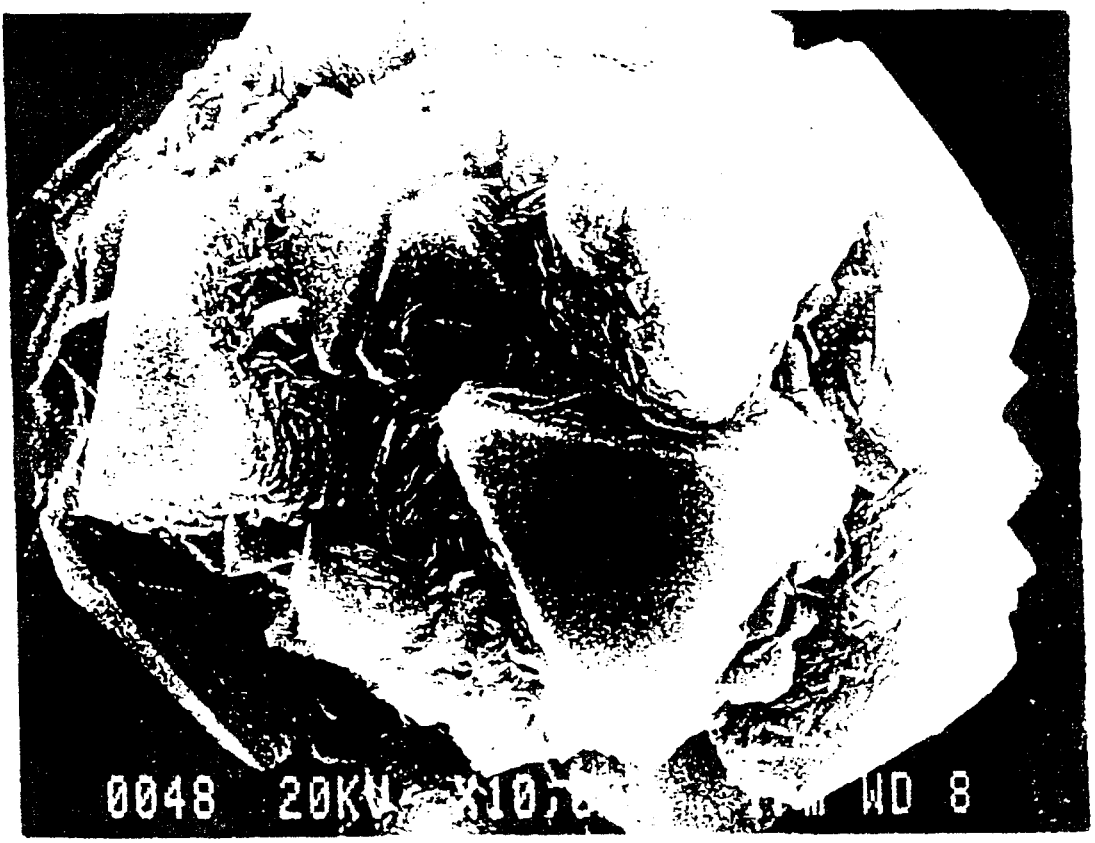
FIG. 1 is a scanning electron photomicrograph of nickel hydroxide particles obtained in Example 1 of the invention (10000 magnifications).
Figure 2:
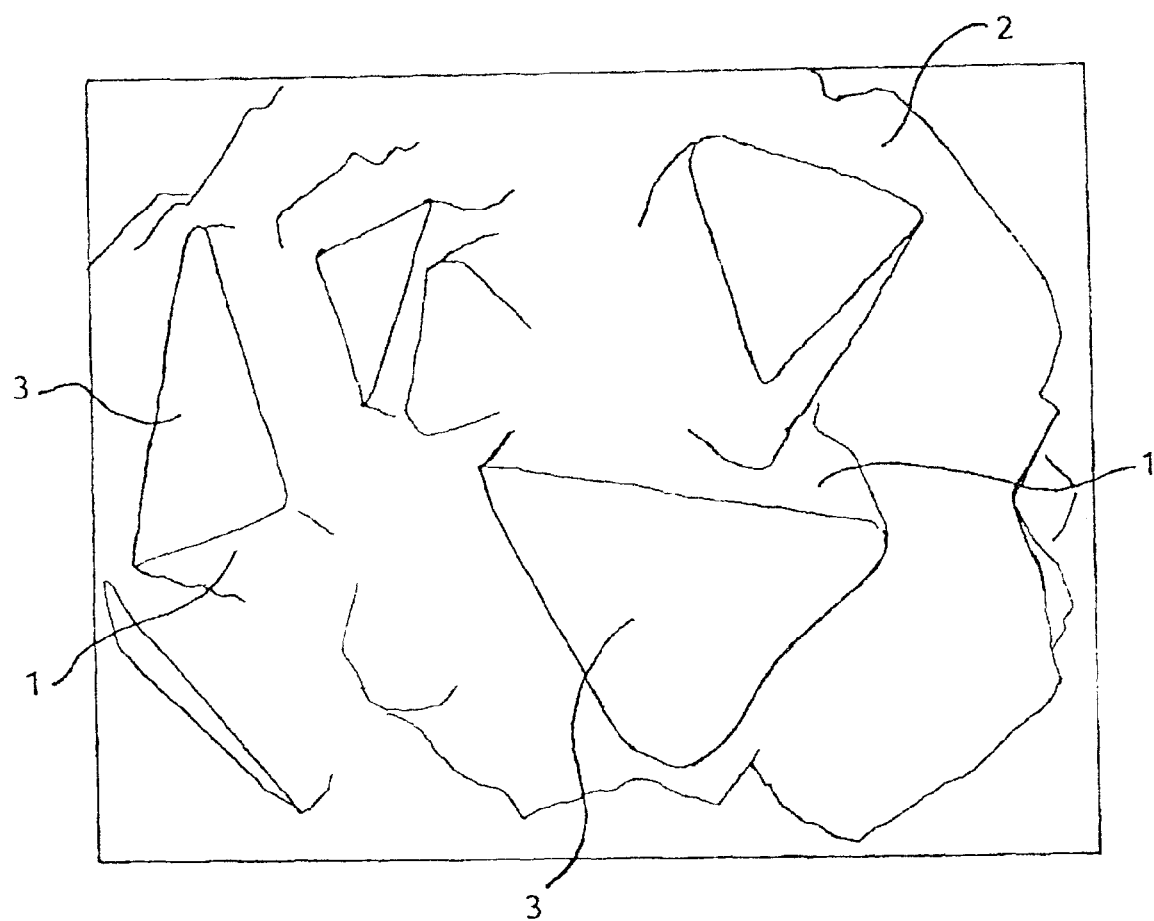
FIG. 2 is a view schematically showing the nickel hydroxide particles in FIG. 1.

FIG. 1 shows a scanning electron photomicrograph of an example of the nickel hydroxide secondary particles according to the invention. As shown schematically in FIG. 2, the nickel hydroxide secondary particles 2 of the invention are comprised of agglomerates of primary particles 1 of nickel hydroxide and the primary particles are in the shape of a triangular prism or a triangular plate and have an exposed surface 3 or a outer face in the form of a substantially equilateral triangle. In the invention, the surface or outer face of the nickel hydroxide particles means a portion of the primary particles of nickel hydroxide exposed in this way.

In the nickel hydroxide particles as described above, when the length of a side of the equilateral triangle of the triangular prism or triangular plate shaped primary particle is 1 μm or less, the resulting primary particles of the lithium nickel composite oxide obtained using the nickel hydroxide particles as the starting material also have a particle diameter of about 1 μm. That is, the resulting primary particles of lithium nickel composite oxide have no substantial difference from the known lithium nickel composite oxide particles obtained using, as the starting material, spherical secondary particles of nickel hydroxide comprised of agglomerates of primary particles of a small particle diameter.

In turn, when the length of a side of the equilateral triangle of a triangular prism or a triangular plate shaped primary particle is not less than 10 μm, the secondary particles formed by agglomeration of such primary particles have a particle diameter as large as 40 to 50 μm. Such a particle diameter is excessively large. Accordingly, if such secondary particles are mixed with a lithium compound and the resulting mixture is sintered, no uniform reaction takes place between the nickel hydroxide particles and the lithium compound. In particular, no uniform composite oxide can he obtained in which lithium diffuses inside enough the nickel hydroxide particles. Thus, the use of such a composite oxide as a cathode active material having no uniform composition as described above provides a lithium ion secondary battery poor in cycle characteristics.

The nickel hydroxide particles of the invention as described above can be obtained by neutralizing a water-soluble nickel salt by using ammonia and an alkali hydroxide in an aqueous solution to form precipitates. There is no particular restriction for the nickel salts usable but, considering that the lithium nickel composite oxide is produced by sintering the thus obtained nickel hydroxide, it is preferred that the salt is easily decomposable or has an anion easily volatile upon sintering. Accordingly, nickel nitrate is preferably used, for example. Ammonia may be used as a gas but preferably used as aqueous ammonia. The alkali hydroxide usable is, for example, sodium hydroxide, potassium hydroxide or lithium hydroxide, sodium hydroxide being used particularly preferable.

In the neutralization reaction of the nickel salt as mentioned above, the concentrations of the aqueous nickel salt solution and the aqueous alkali hydroxide solution are not particularly limited. However, it is usually preferred that the aqueous nickel salt solution has a concentration of 1 to 3 mol/L while the aqueous alkali hydroxide solution has a concentration of 1 to 10 mol/L. When aqueous ammonia is used, it has preferably a concentration of 10 to 1 mol/L.

According to a preferred embodiment of the invention, the nickel hydroxide particles are produced, for example, by placing a small amount of Later or aqueous ammonia in a reactor having a stirrer, and then adding thereto continuously an aqueous nickel salt solution, an aqueous alkali hydroxide solution and aqueous ammonia, whereupon neutralizing the nickel salt at a temperature of 20° C. to 50° C. while keeping the pH of the resulting reaction mixture (slurry) in the reactor within a range from 10 to 11 and keeping the concentration of ammonia in the reaction mixture in the reactor at 0.5 mol/L or higher, preferably, within a range from 0.7 to 3 mol/L, thereby precipitating particles of nickel hydroxide, and collecting the particles by filtration and drying the same.

Since the reaction temperature gives an effect on the concentration of ammonia in the reaction mixture in the reactor, it is preferred that the reaction temperature is low and, it is usually within a range from 20° C. to 50° C., as described above in view of economical performance. The reaction time is properly selected considering the size of primary particles and secondary particles of nickel hydroxide to be formed and usually it is about from 20 to 48 hours.

As described above, there is obtained nickel hydroxide secondary particles having a large particle diameter comprised of agglomerates of primary particles having a large particle diameter: the shape of a triangular prism or a triangular plate and a surface or outer face in the for, of a substantially equilateral triangle. The length of a side of the substantially equilateral triangle in the primary particles is within a range from 1 to 10 μm, preferably, within a range from 1 to 77 μm.

In addition, the nickel hydroxide particles of the invention have a half value width of a peak on 101 face within a range from 0.2 to 0.3 degrees as measured by X-ray diffractiometry, preferably, within a range from 0.2 to 0.28 degrees. This is one of important features of the nickel hydroxide particles of the invention since the particles have very high crystallinity compared with the known nickel hydroxide particles, as illustrated by the small half value width.

Further according to the invention, the composite nickel hydroxide secondary particles containing the composite element and comprised of agglomerates of primary particles in the shape of a triangular prism or a triangular plate having a substantially equilateral triangular surface or outer face each side of which substantially equilateral triangle has a length within a range from 1 to 10 μm, preferably, 1 to 7 μm by neutralizing an aqueous solution containing a water-soluble nickel salt, preferably, nickel nitrate, together with a salt of at least one composite element selected from the group consisting of Mg, Ca, Sr, Ba, Al, V, Mn, Fe and Co with an aqueous solution of alkali hydroxide and aqueous ammonia in an aqueous solution, as described hereinabove.

When the composite nickel hydroxide particles containing at least one composite element selected from the group consisting of Mg, Ca, Sr, Ba, Al, V, Mn, Fe and Co is prepared in a manner as described above, the atomic ratio of such an element to nickel, namely, the composite element/Ni atomic ratio is usually 0.5 or less and, preferably, within a range from 0.001 to 0.5 and, particularly-preferably, within a range from 0.05 to 0.4. If the atomic ratio exceeds 0.5, composite nickel hydroxide particles having desired shape and size can not often be obtained.

In addition, according to the invention, at least one deposition or coating element selected from the group consisting of Mg, Ca, Sr, Ba, Al, V, Mn , Fe and Co can be deposited or coated as oxides and/or hydroxides on the surface of the (composite) nickel hydroxide particles as described above. The nickel hydroxide particles having such a deposited or coated element on the surface can be obtained by dispersing the (composite) nickel hydroxide particles in water to form a slurry and then neutralizing the salt of the deposition or coating element with an alkali hydroxide in the slurry and depositing or coating the oxide or the hydroxide of the deposition or coating element.

According to a preferred embodiment, the nickel hydroxide particles having such a deposition or coating element on the surface can be obtained by dispersing the (composite) nickel hydroxide particles of the invention in water to form a slurry, placing the slurry in a reactor, adding thereto an aqueous solution of the salt of the deposition or coating element and an aqueous solution of the alkali hydroxide continuously under stirring, thereby neutralizing the salt of the deposition or coating element, depositing or coating the element as hydroxides or oxides on the surface of the (composite) nickel hydroxide particles, followed by filtering and drying the product.

For neutralizing the salt of the deposition or coating element to form a hydroxide or oxide and then depositing or coating the same on the surface of the (composite) nickel hydroxide particles, it is necessary to control the pH in the reactor to an optimal pH in accordance with the deposition or coating element used to form the hydroxide or the oxide. Thus, it is preferred to maintain the reaction mixture in the reactor at a pH of 7 to 8 to deposit or coat, for example, aluminum by using aluminum sulfate.

When the deposition or coating element is deposited or coated on the surface of the (composite) nickel hydroxide particles, the amount of the deposition or coating element is not particularly limited, but the deposition or coating element/(Ni and composite elements) atomic ratio is usually 0.5 or less, preferably, within a range from 0.001 to 0.5 and, particularly preferably, within a range from 0.01 to 0.33. If the atomic ratio exceeds 0.5, the hydroxide or the oxide of the deposition or coating element often forms nuclei newly in an aqueous phase other than the surface of the (composite) nickel hydroxide particles.

In the (composite) nickel hydroxide particles formed by depositing or coating the deposition or coating element on the surface in this way, the primary particles of the (composite) nickel hydroxide are usually coated uniformly with the hydroxide or the oxide of the deposition or coating element, making it difficult to confirm the original shape of triangular prism or triangular plate of the primary particles. However, according to the invention, even the (composite) nickel hydroxide particles having the deposition or coating element on the surface, when they are used as the starting material under the conditions to be described later, provide lithium nickel composite oxide primary particles having a large particle diameter like that the (composite) nickel hydroxide particles having no deposition or coating element on the surface.

That is, since the element deposited or coated on the surface of the (composite) nickel hydroxide particles easy diffuses into the (composite) nickel hydroxide particles while the nickel hydroxide particles and the lithium compound are mixed and sintered in an oxidative atmosphere, they give a composite oxide following the shape and the size of the (composite) nickel oxide particles as a substrate.

As described above, according to the invention, the composite nickel hydroxide particles containing the composite element other than nickel can be obtained as secondary particles comprised of agglomerates of primary particles in the shape of a triangular prism or a triangular plate having a substantially equilateral triangular surface or outer face by neutralizing an aqueous solution containing the salt of the composite element together with the nickel salt with an aqueous solution of an alkali hydroxide and aqueous ammonia. In turn, the deposited or coated nickel hydroxide particles containing the deposition or coating element other than nickel can be obtained by neutralizing a salt of the deposition or coating element with an aqueous solution of an alkali hydroxide in a slurry prepared by dispersing the nickel hydroxide particles in water, although the characteristic shape of the primary particles is difficult to be recognized. As a matter of fact, according to the invention, any deposition or coating element may be deposited or coated on the composite nickel hydroxide particles containing any composite element.

According to the invention, lithium nickel composite oxide secondary particles comprised of primary particles having a large particle diameter can be obtained easily by using the (composite) nickel hydroxide particles (including the deposited or coated (composite) nickel hydroxide particles) described above as a starting material.

More specifically, the (composite) nickel hydroxide particles of the invention and a lithium compound are mixed together in an atomic ratio of Li/Ni (and the composite element and/or deposition or coating element other than nickel when they are contained) within a range from 1.00 to 1.05, and the resulting mixture is sintered in an oxidative atmosphere such as in air or oxygen at a temperature of 600° C. to 1000° C., preferably 700° C. to 850° C., for about 10 to 30 hours followed by pulverization, thereby providing lithium nickel composite oxide secondary particles having an average particle diameter of 3–30 μm and comprised of primary particles having a particle diameter of 1–10 μm. The invention has a particular advantage that the amount of fine particles of 1 μm or less produced is small when the obtained sintered products are pulverized.

Accordingly, the lithium nickel (and magnesium, calcium, strontium, barium, aluminum, vanadium, manganese, iron and/or cobalt as the composite element and/or deposition or coating element) composite oxide has a tapping (filling) density as large as 1.5 to 2.0 g/mL and a specific surface to area as small as 0.05 to 1 m$^2$/g. Besides, it has a desirable physical property as a cathode active material. Thus, the use of the lithium nickel composite oxide of the invention as a cathode electrode active material provides a non-aqueous electrolyte lithium ion secondary battery having excellent characteristics with less reduction of capacity when it is subjected to charge discharge cycles at a high temperature and less self discharge when it is stored at a high temperature.

In the production of the lithium nickel composite oxide described above, lithium carbonate or lithium hydroxide monohydrate is preferably used as a lithium compound, for example. When the reaction temperature is 600° C. or less, lithium is not sufficiently doped into the composite oxide particles whereas when it is more than 1000° C., lithium is evaporated to fluctuate the lithium/nickel atomic ratio and nickel oxide or the like is undesirably formed as impurities,

EXAMPLES

The invention will be explained with reference to examples but the invention is not limited to these examples. In the following description, "%" means "% by weight" unless otherwise specified.

Example 1
(Production of Nickel Hydroxide Particles)
About 2 liters of minimum amount of aqueous ammonia (1.0 mol/L) were placed in a reactor having about 10 liter capacity so that a stirring blade was dipped barely in the aqueous ammonia. An aqueous solution of nickel nitrate (2.4 mol/L) and aqueous ammonia (13.3 mol/L) were added to the reactor successively under stirring at a rate of 99 ml/hr and 18 ml/hr, respectively, while on the other hand an aqueous solution of sodium hydroxide (8.6 mol/L) was added continuously to the reactor so that the pH of the resulting mixture was maintained at 10.5±0.3 by operating a liquid feed pump together with a pH controller.

In this way, the reaction was conducted for 48 hours while continuously adding the aqueous solution of nickel nitrate, the aqueous ammonia and the aqueous solution of sodium hydroxide to the reactor. During the reaction, the concentration of ammonia in the reaction mixture (slurry) in the reactor was kept within a range from 1.0 to 1.3 mol/l and the reaction temperature was kept at 40° C.±1° C. with a temperature controller. After the completion of the reaction, the slurry in the reactor was filtered, washed with water and dried to provide a powder of nickel hydroxide.

The thus obtained secondary particles of nickel hydroxide are comprised of agglomerates of primary particles in the shape of a triangular prism or a triangular plate having a substantially equilateral triangular surface or outer face each side of which was confirmed to have a length of 1 μm or more, as shown by a scanning electron microphotograph of FIG. 1. The average particle diameter of the secondary particles was 11.8 μm as measured with a laser diffraction particle size measuring instrument. The powder of the nickel hydroxide had a tapping (filling) density of 1.8 g/mL and a half-value width on 101 face peak was 0.25 degrees as measured by X-ray diffractiometry and a specific surface area of 2.4 m$^2$/g.

Example 2
(Production of Nickel Cobalt Hydroxide Particles (Composite Nickel Hydroxide Particles))

A powder of nickel cobalt hydroxide was obtained in the same manner as in Example 1 except that an aqueous solution of mixture of nickel nitrate and cobalt nitrate (having a Ni/Co atomic ratio of 85/15 and a total concentration of 2.4 mol/L) was used instead of the aqueous solution of nickel nitrate in Example 1.

It was confirmed by a scanning electron microphotograph that the particles of the thus obtained nickel cobalt hydroxide secondary particles were comprised of agglomerates of primary particles in the shape of a triangular prism or a triangular plate having a substantially equilateral triangular surface or outer face each side of which was 1 μm or more, as in the case of the nickel hydroxide particles obtained in Example 1.

The average particle diameter of the secondary particles was 12.1 μm as measured with a laser diffraction particle size measuring instrument. The thus obtained powder of the nickel cobalt hydroxide had a tapping (filling) density of 1.7 g/ml, a half-value width on 101 face peak of 0.26 degrees as measured by X-ray diffractiometry and a specific surface area of 2.9 m$^2$/g.

Comparative Example 1
(Production of Nickel Cobalt Hydroxide Particles (Composite Nickel Hydroxide Particles))

An aqueous solution of mixture of nickel nitrate and cobalt nitrate (having a Ni/Co atomic ratio of 85/15 and a total concentration of 1.6 mol/L) and aqueous ammonia (5.9 mol/L) were added continuously at a rate of 600 ml/hr and 81 ml/hr, respectively, to a reactor having a 10 liter capacity while an aqueous solution of sodium hydroxide (6.0 mol/L) was added continuously to the reactor so that the pH of the resulting mixture was maintained at 12.0±0.2 by operating a liquid feed pump together with a pH controller.

In this way, the reaction was conducted while continuously adding the aqueous solution of mixture of nickel nitrate and cobalt nitrate, aqueous ammonia and the aqueous solution of sodium hydroxide to the reactor and, the resultant reaction mixture (slurry) was taken out of the reactor continuously. After 48 hours from the start of the reaction, the resulting slurry was filtered, washed with water and dried to provide a powder of nickel cobalt hydroxide.

Figure 3:
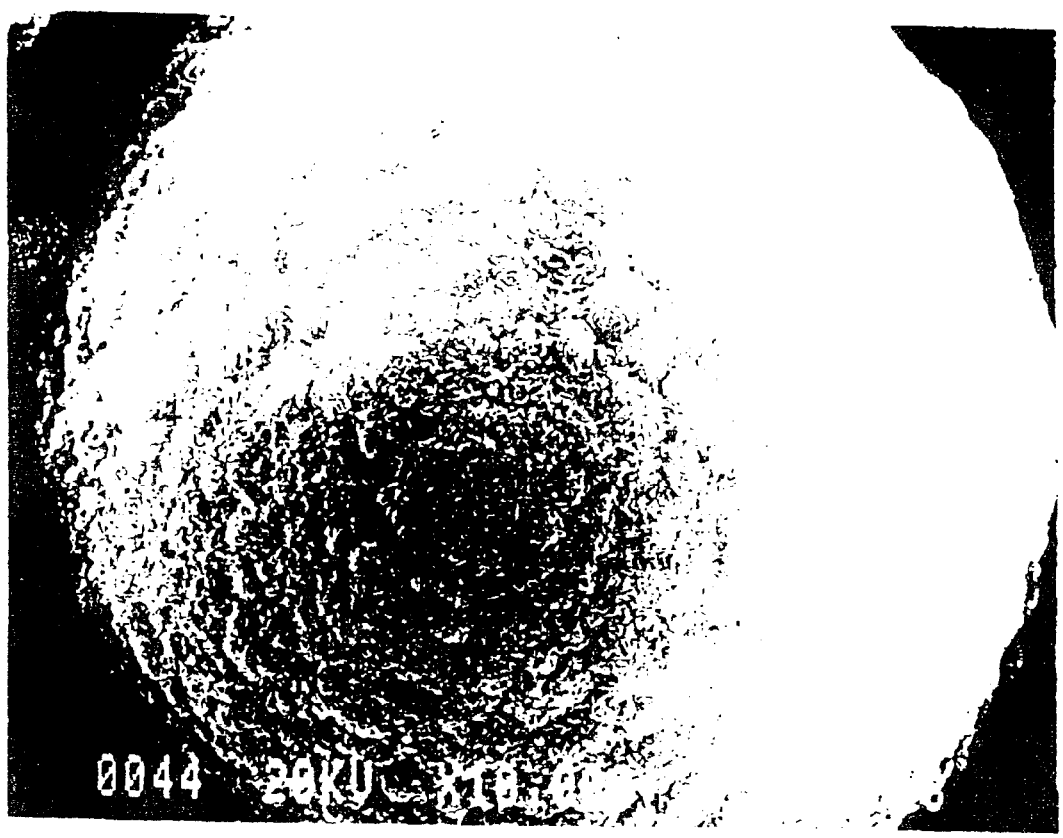
FIG. 3 is a scanning electron photomicrograph of nickel cobalt hydroxide particles obtained in Comparative Example 1 (10000 magnifications).

The thus obtained secondary particles of nickel cobalt hydroxide were spherical and comprised of agglomerates of fine primary particles of a particle diameter of 0.1 μm or less, as shown by a scanning electron microphotograph of FIG. 3.

The average particle diameter of the secondary particles was 12.0 μm as measured with a laser diffraction particle size measuring instrument. The powder of nickel cobalt hydroxide had a tapping (filling) density of 2.0 g/ml and a half-value width on 101 face peak was 0.89 degrees as measured by X-ray diffractiometry and a specific surface area was 30.4 ml/g.

Example 3
(Production of Lithium Nickel Composite Oxide)

Figure 4:
FIG. 4 is a scanning electron photomicrograph of lithium nickelate particles obtained in Example 3 of the invention (10000 magnifications).

A powder of nickel hydroxide obtained in Example 1 was mixed with lithium hydroxide monohydrate in a Li/Ni atomic ratio of 1.02 and the mixture was sintered at a temperature of 800° C. for 20 hours in an oxygen atmosphere. The resulting sintered product was crushed to provide a powder of lithium nickelate, The lithium nickelate thus obtained was comprised of agglomerates of large primary particles having a particle diameter of 1 μm or more, as shown by a scanning electron micro photograph of FIG. 4.

Figure 5:
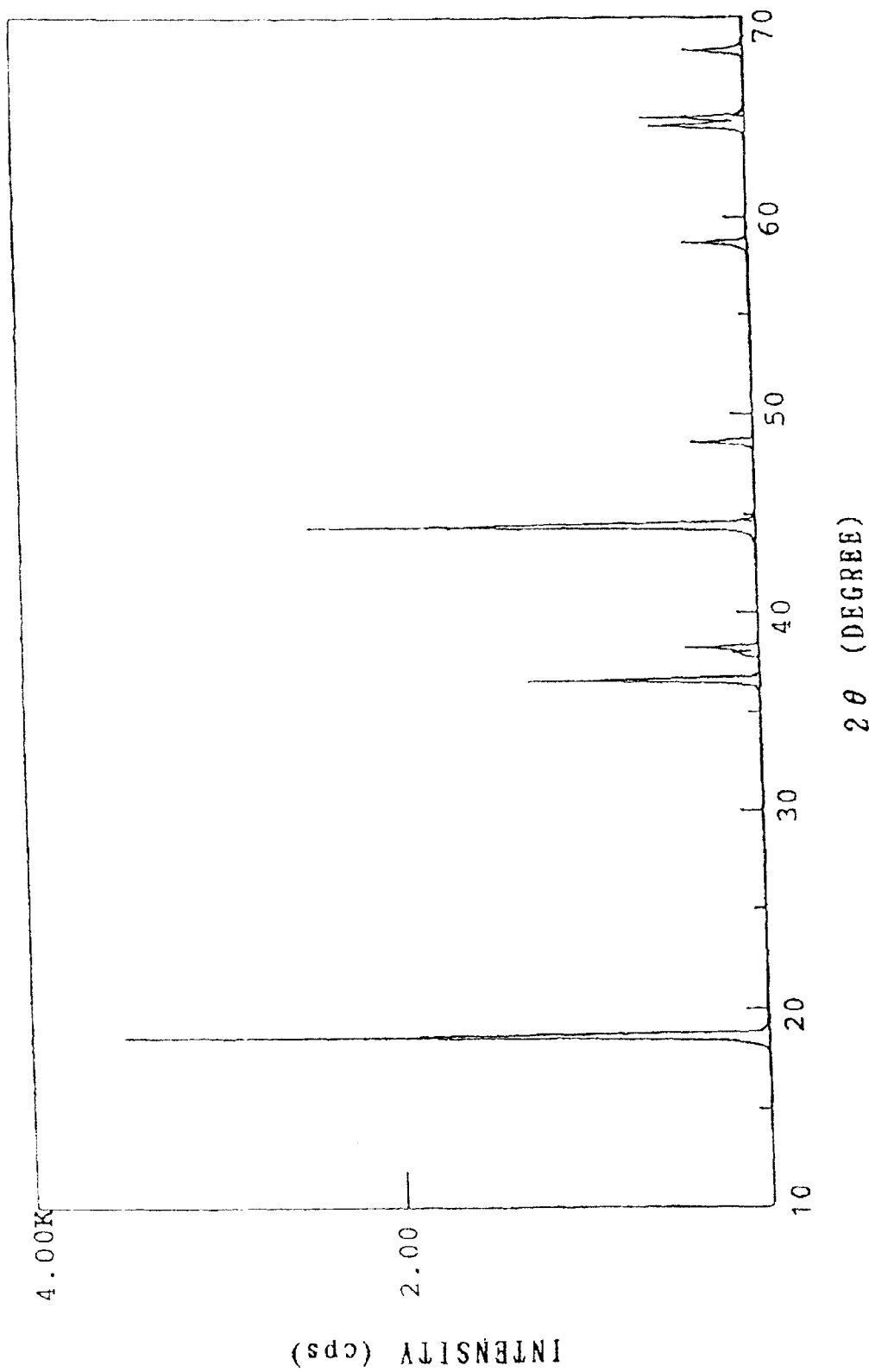
FIG. 5 is an X-ray diffraction pattern of lithium nickelate particles obtained in Example 3 of the invention.

The powder of lithium nickelate had a tapping (filling) density of 1.7 g/ml and a specific surface area of 0.15 m$^2$/g. An X-ray diffraction diagram as measured using Cu-Kα radiation is shown in FIG. 5.

Example 4
(Production of Nickel Cobalt Magnesium Hydroxide Particles (Composite Nickel Hydroxide Particles)

About 2 liters of minimum amount of aqueous ammonia (1.0 mol/L) were placed in a reactor having about 10 liter capacity so that a stirring blade was dipped barely in the aqueous ammonia in the reactor. An aqueous solution of mixture of nickel nitrate, cobalt nitrate and magnesium nitrate (having a Ni/Co/Mg atomic ratio of 81/14/5 and a total concentration of 2.4 mol/L) and aqueous ammonia (13.3 mol/L) were added continuously at a rate of 99 ml/hr and 18 ml/hr, respectively, to the reactor while an aqueous solution of sodium hydroxide (8.6 mol/L) was added continuously to the reactor so that the psi of the resulting mixture was maintained at 10.5±0.3 by operating a liquid feed pump together with a pHl controller.

In this way, the reaction was conducted for 48 hours while continuously adding the aqueous solution of mixture of nickel nitrate, cobalt nitrate and magnesium nitrate, the aqueous ammonia and the aqueous solution of sodium hydroxide to the reactor. During the reaction, the concentration of ammonia in the reaction mixture (slurry) in the reactor was kept within a range from 1.0 to 1.3 mol/L and the reaction temperature was kept at 30° C.±1° C. with a temperature controller. After the completion of the reaction, the slurry in the reactor was filtered, lashed with water and dried to provide a powder of nickel cobalt magnesium hydroxide.

Figure 6:
FIG. 6 is a scanning electron photomicrograph of nickel cobalt magnesium hydroxide particles obtained in Example 4 of the invention (10000 magnifications).

The thus obtained secondary particles of nickel cobalt magnesium hydroxide were comprised of agglomerates of primary particles in the shape of a triangular prism or a triangular plate having a substantially equilateral triangular surface or outer face each side of which was confirmed to have a length of 1 μm or more, as shown by a scanning electron microphotograph of FIG. 6.

The average particle diameter of the secondary particles was 14.9 μm as measured with a laser diffraction particle size measuring instrument. The powder of the nickel cobalt magnesium hydroxide had a tapping (filling) density of 2.0 g/mL and a half-value width on 101 face peak was 0.26 degrees as measured by X-ray diffractiometry and a specific surface area of 2.0 m$^2$/g.

Example 5
(Production of Nickel Cobalt Calcium Hydroxide Particles (Composite Nickel Hydroxide Particles))

A powder of nickel cobalt calcium hydroxide was obtained in the same manner as in Example 4 except that an aqueous solution of mixture of nickel nitrate, cobalt nitrate and calcium nitrate (having a Ni/Co/Ca atomic ratio of 81/14/5 and a total concentration of 2.4 mol/L) was used instead of the aqueous solution of mixture of nickel nitrate, cobalt nitrate and magnesium nitrate in Example 4.

It was confirmed by a scanning electron microphotograph that the particles of the thus obtained nickel cobalt calcium hydroxide secondary particles were comprised of agglomerates of primary particles in the shape of a triangular prism or a triangular plate having a substantially equilateral triangular surface or outer face each side of which was 1 μm or more, as in the case of the nickel cobalt magnesium hydroxide particles obtained in Example 4.

The average particle diameter of the secondary particles was 13.2 μm as measured with a laser diffraction particle size measuring instrument. The thus obtained powder of the nickel cobalt calcium hydroxide had a tapping (filling) density of 2.0 g/ml, a half-value width on 101 face peak of 0.26 degrees as measured by X-ray diffractiometry and a specific surface area of 2.3. m$^2$/g.

Example 6
(Production of Nickel Cobalt Strontium Hydroxide Particles (Composite Nickel Hydroxide Particles))

A powder of nickel cobalt strontium hydroxide was obtained in the same manner as in Example 4 except that an aqueous solution of mixture of nickel nitrate, cobalt nitrate and strontium nitrate (having a Ni/Co/Sr atomic ratio of 81/14/5 and a total concentration of 2.4 mol/L) was used instead of the aqueous solution of mixture of nickel nitrate, cobalt nitrate and magnesium nitrate in Example 4.

It was confirmed by a scanning electron microphotograph that the secondary particles of the thus obtained nickel cobalt strontium were comprised of agglomerates of primary particles in the shape of a triangular prism or a triangular plate having a substantially equilateral triangular surface or outer face each side of which was 1 μm or more, as in the case of the nickel cobalt magnesium hydroxide particles obtained in Example 4.

The average particle diameter of the secondary particles was 12.9 μm as measured with a laser diffraction particle size measuring instrument. The thus obtained powder of the nickel cobalt strontium hydroxide had a tapping (filling) density of 1.9 g/ml, a half-value width on 101 face peak of 0.26 degrees as measured by X-ray diffractiometry and a specific surface area of 2.4 m$^2$/g.

Example 7
(Production of Nickel Cobalt Barium Hydroxide Particles (Composite Nickel Hydroxide Particles))

A powder of nickel cobalt barium hydroxide was obtained in the same manner as in Example 4 except that an aqueous solution of mixture of nickel nitrate, cobalt nitrate and barium nitrate (having a Ni/Co/Ba atomic ratio of 84/15/1 and a total concentration of 2.4 mol/L) was used instead of the aqueous solution of mixture of nickel nitrate, cobalt nitrate and magnesium nitrate in Example 4.

It was confirmed by a scanning electron microphotograph that the secondary particles of the thus obtained nickel cobalt barium hydroxide were comprised of agglomerates of primary particles in the shape of a triangular prism or a triangular plate having a substantially equilateral triangular surface or outer face each side of which was 1 μm or more, as in the case of the nickel cobalt magnesium hydroxide particles obtained in Example 4.

The average particle diameter of the secondary particles was 11.7 μm as measured with a laser diffraction particle size measuring instrument. The thus obtained powder of the nickel cobalt barium hydroxide had a tapping (filling) density of 1.9 g/ml, a half-value width on 101 face peak of 0.26 degrees as measured by X-ray diffractiometry and a specific surface area of 2.5 m$^2$/g.

Example 8
(Production of Nickel Cobalt Aluminum Hydroxide Particles (Composite Nickel Hydroxide Particles)

About 2 liters of minimum amount of aqueous ammonia (1.0 mol/L) were placed in a reactor having about 10 liter capacity so that a stirring blade was dipped barely in the aqueous ammonia in the reactor. An aqueous solution of mixture of nickel nitrate, cobalt nitrate and aluminum nitrate (having a Ni/Co/Al atomic ratio of 84/15/1 and a total concentration of 2.4 mol/L) and aqueous ammonia (13.3 mol/L) were added continuously at a rate of 99 ml/hr and 18 ml/hr, respectively, to the reactor while an aqueous solution of sodium hydroxide (8.6 mol/L) was added continuously to the reactor so that the pH of the resulting mixture was maintained at 10.5±0.3 by operating a liquid feed pump together with a pH controller.

In this way, the reaction was conducted for 48 hours while continuously adding the aqueous solution of mixture of nickel nitrate, cobalt nitrate and aluminum nitrate, the aqueous ammonia and the aqueous solution of sodium hydroxide to the reactor. During the reaction, the concentration of ammonia in the reaction mixture (slurry) in the reactor was kept within a range from 1.0 to 1.3 mol/L and the reaction temperature was kept at 30° C.±1° C. with a temperature controller, After the completion of the reaction, the slurry in the reactor was filtered, washed with water and dried to provide a powder of nickel cobalt aluminum hydroxide.

Figure 7:
FIG. 7 is a scanning electron photomicrograph of nickel cobalt aluminum hydroxide particles obtained in Example 8 of the invention (10000 magnifications).
Figure 8:
FIG. 8 is a scanning electron photomicrograph of nickel cobalt hydroxide particles having aluminum hydroxide deposited or coated on the surface obtained in Example 9 of the invention (10000 magnifications).

The thus obtained secondary particles of nickel cobalt aluminum hydroxide are comprised of agglomerates of primary particles in the shape of a triangular prism or a triangular plate having a substantially equilateral triangular surface or outer face each side of which was confirmed to have a length of 1 μm or more, as shown by a scanning electron microphotograph of FIG. 7.

The average particle diameter of the secondary particles was 11.4 μm as measured with a laser diffraction particle size measuring instrument. The powder of the nickel cobalt aluminum hydroxide had a tapping (filling) density of 1.7 g/mL and a half-value width on 101 face peak was 0.26 degrees as measured by X-ray diffractiometry-and a specific surface area of 3.1 m$^2$/g.

Example 9
(Production of Nickel Hydroxide Particles Having Aluminum Coated Thereon (Coated Composite Nickel Hydroxide Particles))

1 kg of powder of nickel cobalt hydroxide obtained in Example 2 was placed in a 5 liter capacity reactor together with water to prepare a total volume of 1.5 liters of slurry. An aqueous solution of aluminum nitrate (0.9 mol/L) was added to the slurry continuously at a rate of 600 ml/hr while an aqueous solution of sodium hydroxide (2.7 mol/L) was added continuously to the slurry so that the pH of the resulting mixture was maintained at 7.5±0.3 by operating a liquid feed pump together with a pH controller.

In this way, the reaction was conducted for 2.5 hours while continuously adding the aqueous solution of aluminum nitrate and the aqueous solution of sodium hydroxide to the reactor. After the completion of the reaction, the slurry in the reactor was filtered, washed with water and dried to provide a powder of nickel cobalt hydroxide having aluminum deposited or coated on the surface and an Al/(Ni+Co) atomic ratio of 0.1.

The thus obtained secondary particles of nickel cobalt hydroxide having aluminum deposited or coated on the surface were found to have aluminum hydroxide stuck uniformly on the surface. The original shape of a triangular prism or a triangular plate of the primary particles was seen in part in the secondary particles.

The average particle diameter of the secondary particles of nickel cobalt hydroxide having aluminum deposited or coated on the surface was 13.5 μm as measured with a laser diffraction particle size measuring instrument. The powder of the nickel cobalt. aluminum hydroxide had a tapping (filling) density of 1.6 g/mL and a half-value width on 101 face peak was 0.26 degrees as measured by X-ray diffractiometry and a specific surface area of 15.2 m$^2$/g.

Comparative Example 2
(Production of Nickel Cobalt Aluminum Hydroxide Particles (Composite Nickel Hydroxide Particles))

An aqueous solution of mixture of nickel nitrate, cobalt nitrate and aluminum nitrate (having a Ni/Co/Al atomic ratio of 84/15/1 and a total concentration of 1.6 mol/L) and aqueous ammonia were added at a rate of 600 ml/hr and 81 ml/hr, respectively, continuously to a 10 liter capacity reactor while an aqueous solution of sodium hydroxide (6.0 mol/L) was added continuously to the reactor so that the pH of the resulting mixture was maintained at 12.0±0.2 by operating a liquid feed pump together with a pH controller.

In this way, the reaction was conducted for 48 hours while continuously adding the aqueous solution of mixture of nickel nitrate, cobalt nitrate and aluminum nitrate, aqueous ammonia and the aqueous solution of sodium hydroxide to the reactor and continuously taking the resulting reaction mixture (slurry) out of the reactor. After 48 hours from the start of the reaction, the resulting slurry was filtered, washed with water and dried to provide a powder of nickel cobalt aluminum hydroxide.

Figure 9:
FIG. 9 is a scanning electron photomicrograph of nickel cobalt aluminum hydroxide particles obtained in Comparative Example 2 (10000 magnifications).

The thus obtained secondary particles of nickel cobalt aluminum hydroxide were spherical and comprised of agglomerates of fine primary particles of a particle diameter of 0.1 μm or less, as shown by a scanning electron microphotograph of FIG. 9.

The average particle diameter of the secondary particles was 2.1 μm as measured with a laser diffraction particle size measuring instrument. The thus obtained powder of the nickel cobalt aluminum hydroxide had a tapping (filling) density of 0.9 g/ml, a half-value width on 101 face peak of 0.73 degrees as measured by X-ray diffractiometry and a specific surface area of 83.0 m$^2$/g.

Example 10

(Production of Lithium Nickel Composite Oxide)

Figure 10:
FIG. 10 is a scanning electron photomicrograph of composite lithium nickelate particles containing cobalt and aluminum obtained in Example 10 of the invention (10000 magnifications).

A powder of nickel cobalt hydroxide having aluminum deposited or coated on the surface obtained in Example 9 was mixed with lithium hydroxide monohydrate in a Li/(Ni, Co and Al) atomic ratio of 1.02 and the mixture was sintered at a temperature of 800° C. for 20 hours in an oxygen atmosphere. The resulting sintered product was crushed to provide a powder of lithium nickelate. The lithium nickelate secondary particles thus obtained were comprised of agglomerates of large primary particles having a particle diameter of 1 μm or more, as shown by a scanning electron microphotograph of FIG. 10.

Figure 11:
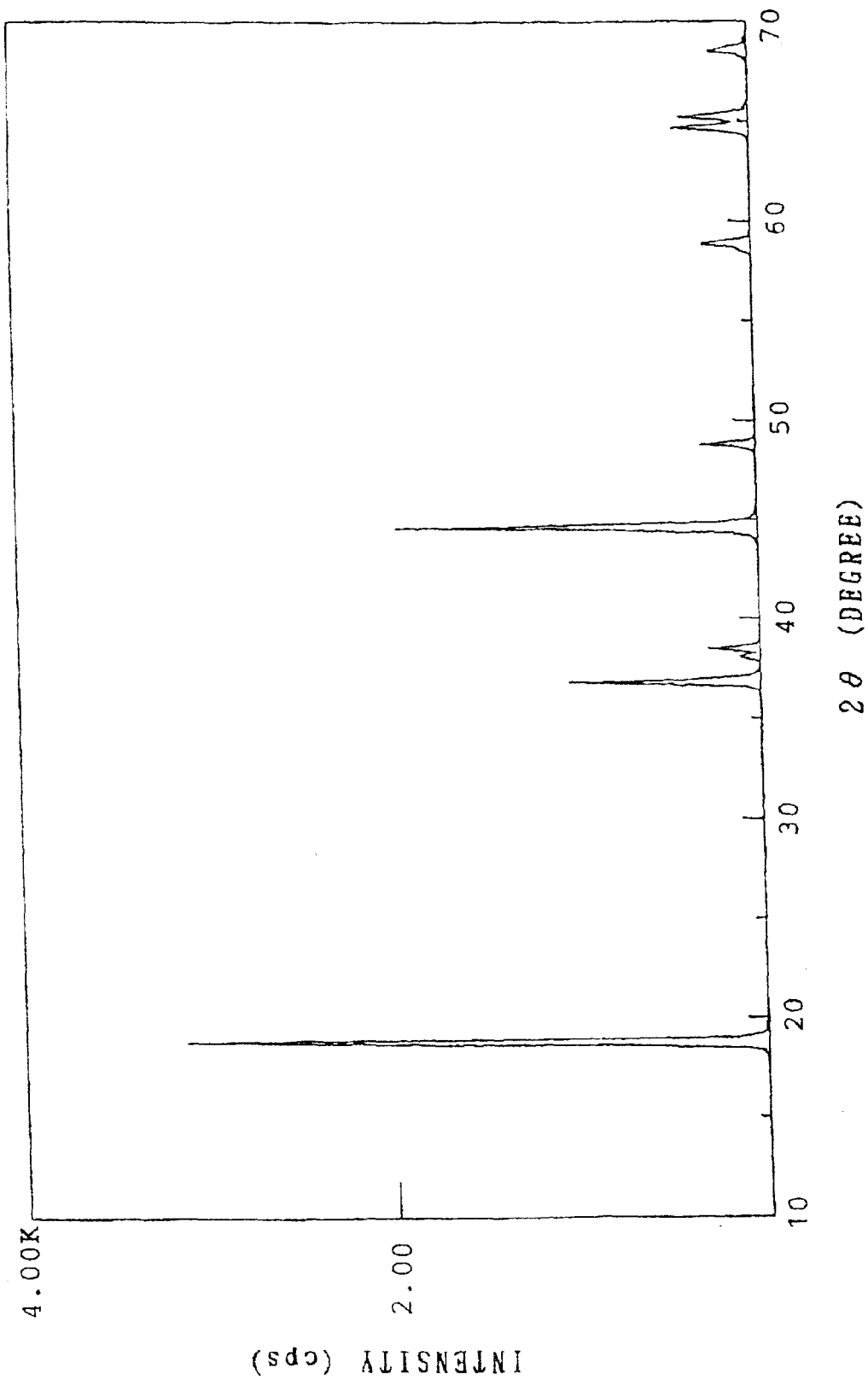
FIG. 11 is an X-ray diffraction pattern of composite lithium nickelate particles obtained in Example 10 of the invention.

The particles of lithium nickelate had an average particle diameter of 11.9 μm, a tapping (filling) density of 1.9 g/ml and a specific surface area of 0.30 m$^2$/g. An X-ray diffraction diagram as measured using Cu-Kα radiation is shown in FIG. 11.

What is claimed is:

1. Nickel hydroxide secondary particles comprising agglomerates of primary particles of nickel hydroxide in the shape of a triangular prism or a triangular plate having a surface or a outer face in the form of a substantially equilateral triangle each side of which substantially equilateral triangle has a length of 1 to 10 μm.

2. The nickel hydroxide secondary particles as claimed in claim 1 which further comprise at least one composite element selected from the group consisting of Mg, Ca, Sr, Ba, Al, V, Mn, Fe and Co in an atomic ratio to Ni of not more than 0.5.

3. The nickel hydroxide secondary particles as claimed in claim 1 which further comprise at least one deposition or coating element selected from the group consisting of Mg, Ca, Sr, Ba, Al, V, Mn, Fe and Co in an atomic ratio to Ni of not more than 0.5.

4. A method for production of nickel hydroxide secondary particles as claimed in claim 1 which comprises continuously adding an aqueous solution of a nickel salt, an aqueous solution of an alkali hydroxide and aqueous ammonia to a reactor having water or aqueous ammonia placed therein, whereupon neutralizing the nickel salt at a temperature in the range of 20° C. to 50° C. while maintaining a resulting reaction mixture in the reactor at a pH in the range of 10 to 11 and the concentration of ammonia in the reaction mixture in the reactor in the range of not less than 0.5 mol/L, thereby precipitating particles of nickel hydroxide, filtering and drying the particles.

5. A method for production of the nickel hydroxide secondary particles as claimed in claim 2 which comprises continuously adding an aqueous solution of a nickel salt containing at least one composite element selected from the group consisting of Mg, Ca, Sr, Ba, Al, V, Mn, Fe and Co, an aqueous solution of an alkali hydroxide and aqueous ammonia to a reactor having water or aqueous ammonia placed therein, whereupon neutralizing the nickel salt and the salts of the composite elements at a temperature in the range of 20° C. to 50° C. while maintaining a resulting reaction mixture in the reactor at a pH in the range of 10 to 11 and the concentration of ammonia in the reaction mixture in the reactor in the range of not less than 0.5 mol/L, thereby precipitating particles of nickel hydroxide containing the composite elements, filtering and drying the particles.

6. A method for production of the nickel hydroxide secondary particles as claimed in claim 3 which comprises neutralizing an aqueous solution of salts of at least one deposition or coating element selected from the group consisting of Mg, Ca, Sr, Ba, Al, V, Mn, Fe and Co with an aqueous solution of an alkali hydroxide in a slurry of the nickel hydroxide, thereby depositing or coating the deposition or coating element as oxides or hydroxides on the surface of the nickel hydroxide secondary particles.

7. A method for production of lithium nickel composite oxide particles comprising mixing the nickel hydroxide as claimed in claim 1, with a lithium compound and sintering a resulting mixture at a temperature in the range of 600° C. to 1000° C. in an oxidative atmosphere.

8. Lithium nickel composite oxide particles obtained by mixing the nickel hydroxide secondary particles as claimed in claim 1 with a lithium compound and sintering the resulting mixture at a temperature in the range of 600° C. to 1000° C., wherein the lithium nickel composite oxide particles having an average particle diameter of 3–30 μm and comprised of primary particles having a particle diameter of 1–10 μm, and a tapping density of 1.5 to 2.0 g/mL and a specific surface area of 0.05 to 1 m$^2$/g.

9. The nickel hydroxide secondary particles as claimed claim 2 which further comprise at least one deposition coating element selected from the group consisting of Mg, Ca, Sr, Ba, Al, V, Mn, Fe and Co in an atomic ratio to Ni of not more than 0.5.

10. A method for production of the nickel hydroxide secondary particles as claimed in claim 9 which comprises neutralizing an aqueous solution of salts of at least one deposition or coating element selected from the group consisting of Mg, Ca, Sr, Ba, Al, V, Mn, Fe and Co with an aqueous solution of an alkali hydroxide in a slurry of the nickel hydroxide, thereby depositing or coating the deposition or coating element as oxides or hydroxides on the surface of the nickel hydroxide secondary particles.

11. A method for production of lithium nickel composite oxide particles comprising mixing the nickel hydroxide as claimed in claim 2 with a lithium compound, and sintering a resulting mixture at a temperature in the range of 600° C. to 1000° C. in an oxidative atmosphere.

12. A method for production of lithium nickel composite oxide particles comprising mixing the nickel hydroxide as claimed in claim 3 with a lithium compound, and sintering a resulting mixture at a temperature in the range of 600° C. to 1000° C. in an oxidative atmosphere.

13. A method for production of lithium nickel composite oxide particles comprising mixing the nickel hydroxide as claimed in claim 9 with a lithium compound, and sintering a resulting mixture at a temperature in the range of 600° C. to 1000° C. in an oxidative atmosphere.

14. Lithium nickel composite oxide particles obtained by mixing the nickel hydroxide secondary particles as claimed in claim 2 with a lithium compound and sintering the resulting mixture at a temperature in the range of 600° C. to 1000° C., wherein the lithium nickel composite oxide particles having an average particle diameter of 3–30 μm and comprised of primary particles having a particle diameter of 1–10 μm, and a tapping density of 1.5 to 2.0 g/mL and a specific surface area of 0.05 to 1 m$^2$/g.

15. Lithium nickel composite oxide particles obtained by mixing the nickel hydroxide secondary particles as claimed in claim 3 with a lithium compound and sintering the resulting mixture at a temperature in the range of 600° C. to 1000° C., wherein the lithium nickel composite oxide particles having an average particle diameter of 3–30 μm and comprised of primary particles having a particle diameter of 1–10 μm, and a tapping density of 1.5 to 2.0 g/mL and a specific surface area of 0.05 to 1 m$^2$/g.

16. Lithium nickel composite oxide particles obtained by mixing the nickel hydroxide secondary particles as claimed in claim 9 with a lithium compound and sintering the resulting mixture at a temperature in the range of 600° C. to 1000° C., wherein the lithium nickel composite oxide particles having an average particle diameter of 3–30 μm and comprised of primary particles having a particle diameter of 1–10 μm, and a tapping density of 1.5 to 2.0 g/mL and a specific surface area of 0.05 to 1 m$^2$/g.

* * * * *